Patented May 23, 1944

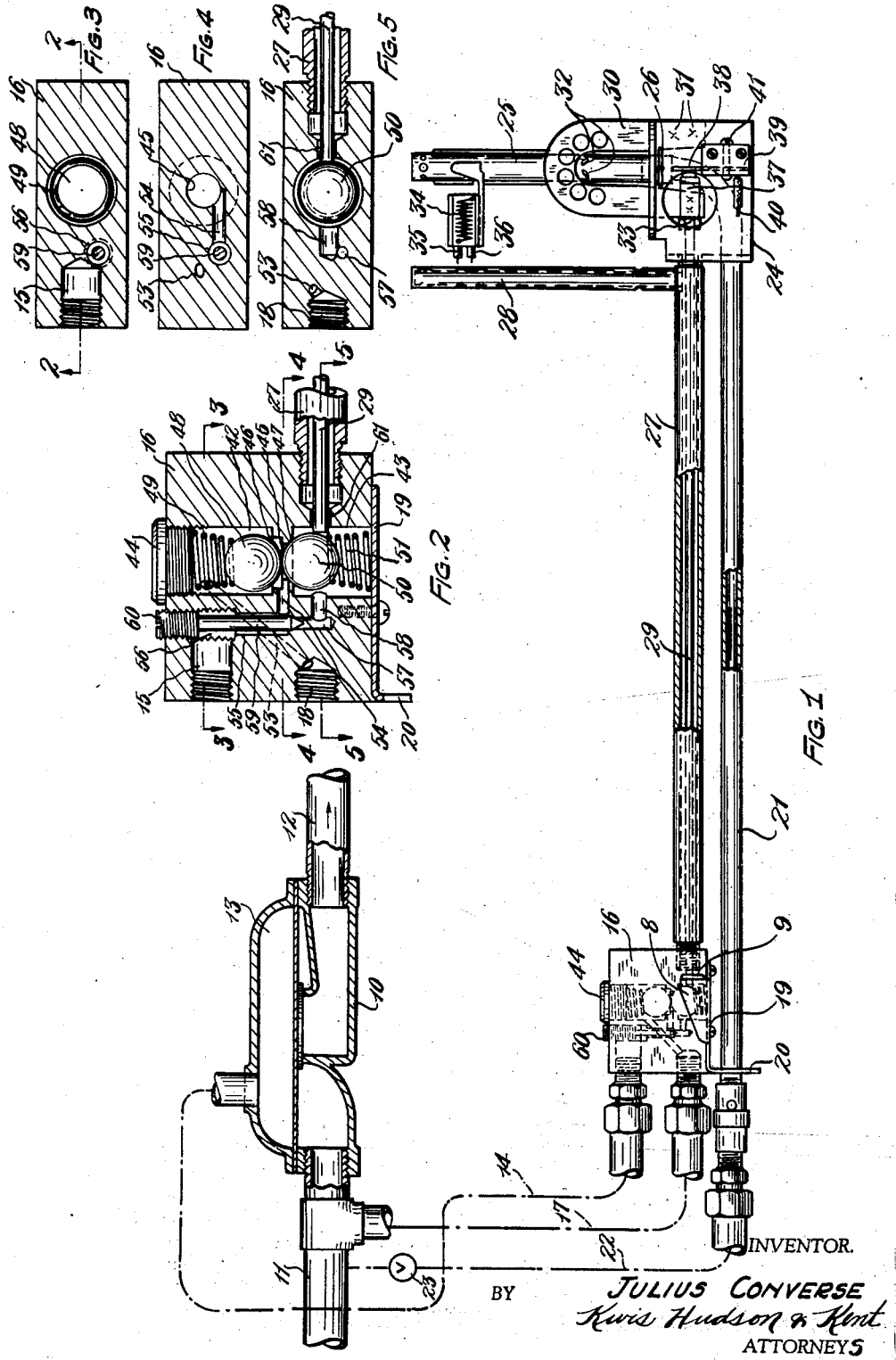

2,349,484

UNITED STATES PATENT OFFICE 2,349,484

PILOT VALVE

Julius Converse, East Cleveland, Ohio, assignor to The Bryant Heater Company, Cleveland, Ohio, a corporation of Ohio Application April 25, 1942, Serial No. 440,518

4 Claims. (Cl. 277—21)

This invention relates to improvements in pilot valves, particularly thermally operated valves for controlling gas burners. The valve of the present invention is a three-way valve intended primarily for connecting the pressure chamber of a main diaphragm valve with the gas supply line or with a bleed line alternately for the purpose of closing or opening the main valve.

One of the objects of the invention is the provision of an improved three-way valve wherein the load imposed upon the thermal member is substantially relieved as soon as the shift from one valve position to the other is effected.

Another object is the provision of a valve such that the overthrow after the shift is effected imposes substantially no load upon the thermal member.

Other objects and features of novelty will appear as I proceed with the description of that embodiment of the invention which, for the purposes of the present application, I have illustrated in the accompanying drawing, in which Fig. 1 is a general elevational view, partly diagrammatic in character, showing my improved valve embodied in a burner control;

Fig. 2 is a vertical sectional view on a larger scale of the valve per se; and

Figs. 3, 4 and 5 are transverse sectional views taken substantially on the lines 3—3, 4—4 and 5—5 of Fig. 2.

In the drawing, 10 represents a diaphragm snap valve of conventional form interposed in a gas line 11, 12 leading to a main burner to be controlled, not illustrated herein. The pressure chamber or control chamber 13 of the diaphragm valve is connected by a tube indicated at 14 with a chamber 15 in a valve body 16 which may be a block of metal cut from a bar. A tubular conductor 17 connects with pipe 11 in advance of the diaphragm valve and extends to a threaded socket 18 in block 16.

A bracket 19 attached to the lower side of block 16 has a depending portion 20 in which is mounted one end of a pilot tube 21 which is also connected by a tube 22 with the pipe 11 in advance of the main diaphragm valve. In this tube 22 there is a valve indicated at 23 which may be any means of controlling the flow of gas under line pressure to the pilot, whether it be manual or automatic. Bracket 19 preferably has sides 8 and wings 9, the latter for attachment to a suitable support such as the casing wall of a furnace or boiler.

The opposite end of tube 21 is provided with a 90° bend which is mounted in or connected to a stamping 24. While this tube might be continued upwardly to constitute the pilot, I prefer to form the latter as a sheet metal tube 25, the lower end of which is telescoped onto the tube 21. In order to secure these parts together and to the stamping 24, I drill registering holes through these parts and insert a cotter pin 26 through the holes.

A tubular brace 27 is interposed between the block 16 and the stamping 24, being threaded at its ends for engagement with those parts. Thus brace 27 also serves as a gas conductor for conveying gas from the valve block 16 to a bleed 28 which extends parallel to the pilot 25. Pilot 25 and bleed 28 are close enough together and close enough to the main burner to permit pilot 25 to be ignited from bleed 28, in cases where electrical ignition is not available, and to permit bleed 28 to be ignited from the main burner, in which case bleed 28 serves as an auxiliary pilot. Brace 27 further functions as a guard and guide for an operating rod 29. One leg of a horseshoe thermal member 30 is attached to stamping 24 at 31. The other leg, which is free to swing in response to pilot flames emerging from ports 32, is adapted to engage one end of rod 29 or a nut 33 adjustably threaded on the rod. The expansion of the thermal member pushes rod 29 to the left as viewed in Fig. 1.

34 is an igniter coil arranged in position to ignite gas emitted from a port near the end of pilot 25. Current is carried to coil 34 by conductors 35 and 36 one of which is grounded to stamping 24 from which current passes through horseshoe 30, through a sheet metal finger 37 welded to the free leg of the horseshoe and through a spring finger 38 normally contacting finger 37, finger 38 being mounted in a block of insulation 39 which is attached to the stamping. Another conductor 40 is connected with finger 38 by means of a bolt 41 or the like.

In the valve block 16 there are two aligned bores 42 and 43, one extending from the top and the other from the bottom surface of the block. The bore 42 is closed by a threaded plug 44 and the bore 43 by the bracket 19. Between the two bores 42 and 43 there is a short passage 45 which terminates at its upper end in a valve seat 46 and at its lower end in a valve seat 47. Seat 46 is adapted to receive a ball 48 which is biased toward valve closing position by a coil spring 49. Seat 47 is adapted to be closed by a ball 50 which is biased toward closing position by a coil spring 51. Spring 51 is stronger than spring 49. Hence normally it forces ball 50 against its seat 47. The parts are so designed that when this occurs ball 50 engages ball 48 and raises it off its seat 46. When rod 29 moves to the left under the influence of the expanding horseshoe, it engages the ball 50 and moves the ball toward the left, as viewed in the drawing, which disengages it from its seat 47 and tilts it to the left and downward which moves it away from engagement with ball 48 and permits the latter ball to descend onto its seat 46 under the influence of gravity and its spring 49. With the valve in the position illustrated, spring 49 might be omitted, gravity alone being depended upon to seat the ball, but I prefer to include the spring in all cases.

Bore 42 is connected with socket 18 by an inclined passage 53, whereby bore 42 is in communication at all times with tubular conductor 17. Extending laterally from the short passage 45, between bores 42 and 43, a passage 54 extends to the bottom of a bore 55 which is coaxial with a threaded bore 56 which runs out at the top of the block. Passage 54 is therefore in communication at all times with tubular conductor 14 extending to the control chamber 13 of the main valve. I provide a by-pass between passage 54 and bore 43, this by-pass consisting of two drilled passages 57 and 58. This by-pass may be closed if desired by means of a needle valve 59 on the lower end of a screw plug 60 which is threaded into bore 56. Bore 43 is connected with the interior of tubular member 27 by a drilled passage 61 which is slightly larger than rod 29 so as to permit the flow of gas from bore 43 into the interior of the tubular member.

Operation: If it be assumed that all of the parts are in the positions illustrated and that there is a call for heat, then the valve 23 is opened and the circuit for igniter coil 34 is closed. These two operations may be either manual or automatic. Gas emerging from a pilot port opposite coil 34 is ignited as soon as that coil reaches the necessary temperature, whereupon flame travels down to ports 32 through the intermediacy of other ports, not shown, extending longitudinally of the pilot. The flames from ports 32 heat the inner radius of horseshoe 30 which expands and swings its free leg to the left. When this occurs, the circuit to the igniter coil is opened between the fingers 37 and 38 and the rod 29 is pushed toward the left. Ball 50 is thereby swung away from its seat and out of engagement with ball 48 which is then free to descend and seat itself. Thereupon the gas in chamber 13 may flow out of that chamber through tube 14, chamber 15 of the valve block, bores 56 and 55, passages 54 and 45, past uncovered valve seat 47, through passage 61 and out by way of tubular member 27 and bleed member 28. The pressure above the diaphragm of the main valve is thereby relieved and the valve is free to respond to line pressure beneath the diaphragm. Gas then flows through the open main valve to the burner and is ignited by the flame from the pilot. The unseating of valve 50 may occur fairly early in the swing of the horseshoe thermal member, and such overthrow of the rod 29 as may occur imposes practically no load upon the thermal member. The tilting of the ball on the far edge of its seat constitutes the chief load which the rod 29 encounters. The power required to move the ball further is negligible.

The main burner and the pilot burner continue to operate so long as there is a call for heat. When the heat requirement is satisfied, valve 23 is closed either manually or automatically, cutting off the flow of gas to the pilot. The horseshoe 30 then cools and its free leg swings to the right, leaving the rod 29 free to move to the right also under the influence of spring 51 acting against ball 50. The latter ball therefore engages its seat 47 and simultaneously raises ball 48 off its seat 46. The connection between the control chamber 13 and the bleed is thereby cut off. At the same time the control chamber 13 is put into communication with the gas supply line through tubular conductor 17, socket 18, inclined passage 53, bore 42, past the uncovered valve seat 46, into short passage 45 and then through passages 54, 55, and 56 to valve chamber 15 and thence through tubular conductor 14 to the control chamber 13. In this way chamber 13 is exposed to line pressure and the diaphragm of main valve 10 is forced to closing position, cutting off flow to the main burner.

In the event that electric ignition is not used, it is desirable to provide a by-pass for gas around the valve seat 47. This may be accomplished by threading the screw 60 upwardly to lift the needle valve 59 off its seat when gas fed to bore 42 may pass open valve seat 46 through passages 45, 54, 57 and 58 into bore 43 and thence out through passage 61 and the interior of tubular member 27 to bleed 28. For the "on" cycle pilot 25 will be ignited from bleed 28. On the "off" cycle pilot 25 goes out, resulting in the seating of ball 50 and the unseating of ball 48. Now if the needle valve 59 is off its seat gas will flow through the by-pass and out to the bleed 28 at the same time that it is flowing into the control chamber 13 of the main valve. Gas flowing from the bleed will therefore be ignited by the flame from the main burner before the latter is extinguished by the closing of valve 10. The bleed will therefore serve as an auxiliary pilot during the periods in which the main pilot 25 is out.

Having thus described my invention, I claim:

1. In apparatus of the character described, means for selectively connecting a pressure chamber with a gas line or with a bleed line, comprising a pair of valve seats associated with said gas line and bleed line, a fluid connection between said valve seats, a conductor from said connection to said pressure chamber, two ball valves each biased toward one of said valve seats, the first ball more strongly than the second, the first ball, when seated, engaging the second ball and holding the latter off its seat, and actuating means projecting through said bleed line for unseating the first ball and moving it laterally away from engagement with the second ball for enabling the latter to seat itself.

2. In apparatus of the character described, a pair of opposed valve seats, two ball valves each biased toward one of said valve seats, the first ball more strongly than the second, the first ball, when seated, engaging the second ball and holding the latter off its seat, and a reciprocable rod arranged to exert a push against the first ball in a direction parallel to its seat for unseating that ball and moving it away from engagement with the second ball, thereby enabling the second ball to seat itself.

3. In apparatus of the character described, means for selectively connecting a pressure chamber with a gas line or with a bleed line, comprising a pair of valve seats, a fluid connection therebetween, a conductor from said fluid connection to said pressure chamber, two ball valves each biased toward one of said valve seats, the first ball more strongly than the second, the first ball, when seated, engaging the second ball and holding the latter off its seat, and actuating means engaging the first ball laterally for unseating that ball and moving it away from engagement with the second ball for enabling the latter to seat itself, said valve having a by-pass connecting said fluid connection with the remote side of the seat for said first ball, and a valve for controlling said by-pass.

4. In apparatus of the character described, a pair of opposed valve seats, a fluid connection therebetween, two ball valves each biased toward one of said valve seats, the first ball more strongly than the second, the first ball when seated engaging the second ball and holding the latter off its seat, and a reciprocable rod arranged to exert a push against the first ball in a direction parallel to its seat for unseating that ball and moving it away from engagement with the second ball, thereby enabling the second ball to seat itself.

JULIUS CONVERSE.